United States Patent [19]

Siviglia

[11] Patent Number: 4,601,556
[45] Date of Patent: Jul. 22, 1986

[54] CORNEAL CONTACT LENS FOR THE EYE OF A PATIENT WITH KERATOCONUS DISEASE AND METHOD OF MAKING THE SAME

[76] Inventor: Nick C. Siviglia, 700 Eden Rd., Lancaster, Pa. 17601

[21] Appl. No.: 545,730

[22] Filed: Oct. 26, 1983

[51] Int. Cl.[4] .............................................. G02C 7/04
[52] U.S. Cl. .................................. 351/160 R; 351/177
[58] Field of Search ............... 351/160 R, 160 H, 161, 351/162, 177

[56] References Cited

U.S. PATENT DOCUMENTS

| Re. 25,286 | 11/1962 | DeCarle | 351/161 |
| 2,664,025 | 12/1953 | Herman | 351/247 |
| 3,937,566 | 2/1976 | Townsley | 351/247 |
| 4,103,992 | 8/1978 | Breger | 351/160 R |
| 4,171,878 | 10/1979 | Kivaev et al. | 351/160 R |
| 4,193,672 | 3/1980 | Trombley | 351/160 R |
| 4,199,231 | 4/1980 | Evans | 351/160 H |

OTHER PUBLICATIONS

Marriott, P. J.; "Special Scleral Lenses"; *Contacto;* Mar. 1975; pp. 11-16.

*Primary Examiner*—John K. Corbin
*Assistant Examiner*—Scott J. Sugarman
*Attorney, Agent, or Firm*—Panitch Schwarze Jacobs & Nadel

[57] ABSTRACT

A contact lens for the eye of a patient with a keratoconus diseased cornea has a posterior surface comprised of three zones, each having a different radius of curvature. The innermost or first zone has a diameter slightly greater than the diameter of the diseased area of the cornea and has a radius of curvature which generally corresponds to but is slightly greater than the outward protrusion of the diseased cornea area. The second zone is generally annular and extends radially beyond the first zone. The second zone has a radius of curvature which is flatter than that of the first zone. The third zone, which is generally annular and extends radially beyond the second zone, has a radius of curvature which is flatter than that of the second zone. A fourth, generally annular, peripheral zone extending beyond the radial outer edge of the third zone may also be provided. The fourth zone includes an outwardly extending edge to facilitate the circulation of oxygen between the lens and the cornea.

6 Claims, 3 Drawing Figures

CORNEAL CONTACT LENS FOR THE EYE OF A PATIENT WITH KERATOCONUS DISEASE AND METHOD OF MAKING THE SAME

BACKGROUND OF THE INVENTION

The present invention relates generally to contact lenses and, more particularly, to a contact lens for the eye of a patient with keratoconus disease and to a method of making such a contact lens.

Keratoconus is a progressive disease of the cornea which often results in an outward protrusion of the central area of the cornea, causing a thinning and disfigurement of the central cornea tissue. Since the cornea is basically a refracting surface for light rays received from the atmosphere, if the cornea is diseased with keratoconus, the resulting protrusion or cone distorts the normal refracting of the light rays causing poor visual acuity and distortion. In addition, keratoconus is often very painful and irritable for the patient.

There are two known basic techniques which may be used to control or correct keratoconus. The first, more drastic technique involves the patient undergoing a surgical corneal transplant. The second, more conventional technique is to fit the patient with a special contact lens having a back or posterior surface which is specifically designed to permit the diseased portion of the cornea to conform itself to the lens surface, resulting in both control of the keratoconus disease and improved visual acuity. Obviously, if the disease can be successfully controlled or corrected using such a special contact lens, a surgical corneal transplant can be avoided.

In the past, keratoconus patients were fitted with large, bulky scleral impression form contact lenses. The large scleral lenses, which fit over the whole cornea and the entire bulb of the eye, were quite uncomfortable to the patient in that they generally fit too close to the protruding cone area therey irritating the cornea. In addition, visual acuity with the large scleral lenses remained relatively poor.

More recently, smaller, corneal contact lenses have been employed for the fitting of patients having keratoconus disease. Initially, the smaller corneal contact lenses were approximately eleven millimeters in diameter and included a variety of peripheral curves. Such early corneal contact lenses attempted to maintain a three point contact with the eye, touching the central corneal tissue where the cornea protruded as well as the normal tissue in as many meridians as possible. These lenses generally put too much or too little pressure on the corneal cone and often resulted in corneal swelling. In some cases such lenses actually worsened the disease.

A new design contact lens has recently emerged for patients having keratoconus disease. The new design lens, called the Soper cone, includes a central area having a single central radius of curvature which permits the lens to bridge or "vault" the diseased area of the cornea and a single flatter peripheral area to provide a bearing surface for engaging the healthy area of the cornea. A relatively sharp demarcation exists between the two areas of the Soper cone lens. Although the Soper cone lens has produced relatively good results, it still provides a three point contact system which results in the application of too much or too little pressure to both the diseased and non-diseased areas of the cornea. In addition, the Soper cone lens results in irritation to the patient due to the sharp demarcations between the two areas which produce irregularities in the lacrimal system due to the passage of too much or too little fluid between the two areas of the lens. The lens also does not improve visual consistently.

The present invention provides an improved contact lens for the eye of a patient with keratoconus disease and a method for making such a lens, which provides better control of the diseased, thinned area of the cornea and more consistency in visual acuity while causing the patient less irritation than with the prior art lenses. The lens of the present invention does not actually contact the cornea. Rather, it relies on fluid compression caused by the differential pressure of the atomsphere outside of the eye and the space between the lens and the eye to maintain a thin layer of tears to cushion the lens from the surface of the cornea.

SUMMARY OF THE INVENTION

Briefly stated, the present invention comprises a contact lens for the eye of a patient with a keratoconus diseased cornea, the lens having a posterior surface comprised of a first, generally circular vaulting zone having a diameter slightly greater than the diameter of the diseased area of the cornea. The first zone has a radius of curvature which generally corresponds to but is slightly greater than the outward protrusion of the diseased area of the cornea. The lens further includes a second, generally annular transition zone extending radially beyond the first zone, in the preferred embodiment, a distance of about 0.05–0.07 millimeters. The second zone has a radius of curvature flatter than that of the first zone, and preferably about 1.25 diopters flatter. The lens further includes a third generally annular bearing zone extending radially beyond the second zone. The third zone has a radius of curvature flatter than that of the second zone, preferably about 2.0 diopters flatter.

The present invention also includes a method for making the above-described lens which includes the steps of establishing the position, size and topography of the diseased area of the cornea and thereafter fabricating a contact lens having a posterior surface comprised of the three zones as described above. Thereafter the patient is refracted to determine the patient's prescription and the anterior surface of the lens is fabricated in accordance with the prescription.

BRIEF DESCRIPTION OF THE DRAWINGS

The foregoing summary, as well as the following detailed description of a preferred embodiment of the invention will be better understood when read in conjunction with the appended drawing, it being understood, however, that this invention is not limited to the precise arrangements illustrated. In the drawing.

DESCRIPTION OF THE PREFERRED EMBODIMENT

Figure 1:
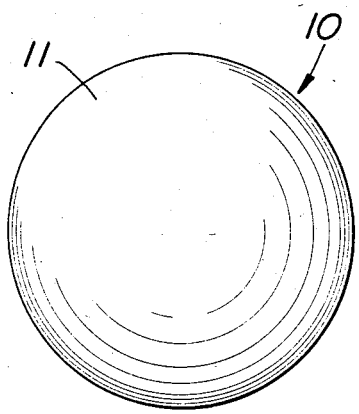
FIG. 1 is a enlarged plan view of a contact lens for the eye of a patient with keratoconus disease in accordance with the present invention.
Figure 2:
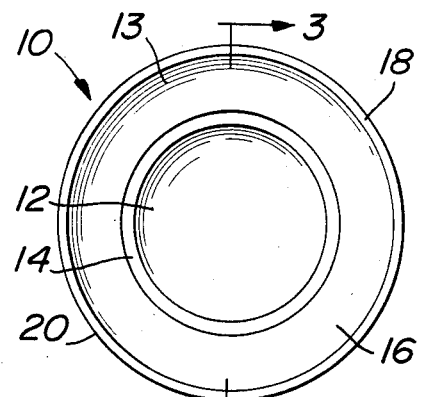
FIG. 2 is a bottom plan view of the lens of FIG. 1.

Referring to the drawing wherein like numerals indicate like elements throughout the several views, and paticularly to FIGS. 1 and 2, it can be seen that the present invention comprises a corneal contact lens 10 having an anterior surface 11 and a posterior surface 13. Posterior surface 13 includes a double central cone as discussed in greater detail below. The lens 10 can be fabricated of any suitable stable contact lens material although good results have been obtained utilizing a silicone oxygen permeable lens.

The lens 10 has a back or posterior surface 13 adjacent the eye which is comprised of a first, generally circular, central vaulting zone 12 having a radial dimension or diameter which is slightly greater than the diameter of the diseased area of the patient's cornea. For example, if the size of the diseased area of the cornea is about four millimeters in diameter, the vaulting zone 12 is approximately five millimeters in diameter and, when the lens 10 is in place upon the cornea, is generally centered upon the diseased area of the cornea. The radius of curvature of the vaulting zone 12 generally corresponds to and is slightly greater than the curvature of the outward protrusion or cone of the diseased area of the cornea. In this manner, when the lens 10 is in place upon the patient's cornea, the vaulting zone 12 completely vaults, without touching, the protruding diseased area of the cornea as will hereinafter become apparent A second, generally annular transition zone 14 extends radially outwardly beyond the end of the vaulting zone 12 as shown. In the present embodiment, the annular transition zone extends about 0.05 to 0.07 millimeters radially beyond the outer end of the vaulting zone 12. The transition zone 14 has a radius of curvature which is flatter than that of the vaulting zone 12 to provide a smooth transition between the steep radius of curvature of the vaulting zone 12 and a bearing zone 16 as will hereinafter be dscribed. In the presently preferred embodiment, the radius of curvature of the transition zone is about 1.25 diopters flatter than the radius of curvature of the vaulting zone 12.

Extending radially outwardly beyond the outer end of the transition zone 14 is a third, generally annular bearing zone 16. The bearing zone 16 has a radius of curvature which is flatter than that of the second zone to provide a wide bearing margin which permits the bearing zone 16 to be slightly spaced from the healthy area of the cornea by a thin layer of tears which supports the lens 10 to maintain the vaulting zone 12 completely off of the diseased area of the cornea. In the presently preferred embodiment, the bearing zone 16 extends radially beyond the transition zone about 1.0 millimeter and has a radius of curvature which is about 2.0 diopters flatter than the radius of curvature of the transition zone 14.

The lens 10 further may include a fourth, peripheral zone 18 extending radially outwardly beyond the outer edge of the bearing zone 16 to the periphery 20 of the lens. The peripheral zone 18 forms an outwardly extending edge to the lens to facilitate the circulation of oxygen and tears between the lens 10 and the cornea.

Figure 3:
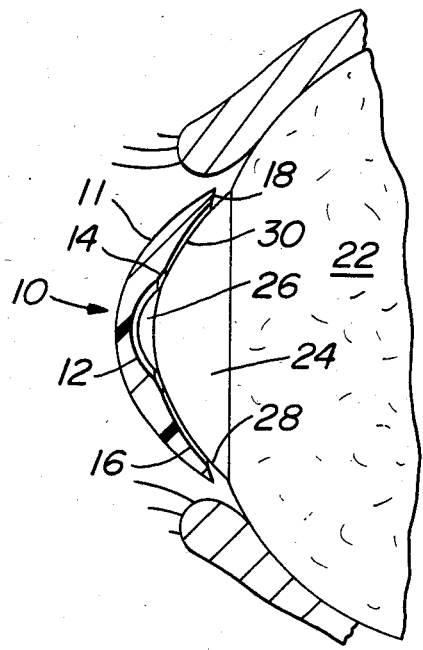
FIG. 3 is a sectional view of the lens of FIG. 2 taken along the lines 3—3 and showing the lens in position associated with the diseased cornea of a patient.

Referring now to FIG. 3, there is shown the lens 10 of FIGS. 1 and 2 in position upon the eye 22 of a patient having keratoconus disease. As shown in FIG. 3, the cornea 24 includes a diseased, outwardly protruded extension area or cone 26 proximate the center of the cornea 24. The protruding cone 26 comprises approximately ⅓ of the surface area of the cornea 24. It is the area of the protruding cone 26 where the cornea tissues are superficially thinned by the disease and where the cornea is most sensitive.

The radially outer portion 28 of the cornea is generally flat and consists of healthy cornea tissue. A so called "grey zone" 30 exists between the diseased protruding cone 26 and the healthy cornea tissue 28.

The lens 10 is positioned on the cornea 24 as shown in FIG. 3 with the bearing zone 16 being spaced slightly from the health cornea tissue 28 by the tear layer and with the vaulting zone 12 bridging or vaulting the protruding cone 26 without actually contacting the cone. Since the vaulting zone 12 is slightly larger in diameter than the diseased protruding cone 26, the lens 10 may move a short distance around the cornea 24 while avoiding direct contact between the vaulting zone 12 and the protruding cone 26. In addition, because the transition zone 14 of the lens provides a relatively smooth transition between the relatively steeply curved vaulting zone 12 and the relatively flat bearing zone 16, the sharp demarcation areas present in prior art lenses are eliminated. Therefore, a slight movement of the lens around the cornea 24 is not accompanied by the irritation which was inherent with such prior art lenses. The transition zone 14 also facilitates the smooth passsge of tears and oxygen without irritation to the cornea 24.

Moreover, it is known that to control the spread of the keratoconus disease, it is desirable to provide for compression of the cornea 24 without putting any direct pressure upon the protuding cone 26. The lens 10 accomplishes this result by vaulting the cone 26 and not putting any substantial pressure on it. At the same time, fluid compression is provided between the bearing zone 16 of the lens and the healthy area of the cornea 28 in all meridians to thereby help to maintain the healthy condition of the undiseased portion 28 of the cornea.

To make or fit a contact lens of the present invention, the exact position, size and topography of the diseased area of the cornea is established throught the use of biomicroscopy and topography studies. The position and extent of the "grey zone" 30 is also determined in order to clearly establish the area of the healthy cornea tissue 28.

Once the exact position, size and topography of both the diseased area and the "grey zone" of the cornea are determined, the posterior surface 11 of the lens can be fabricated by making the vaulting zone 12 with a diameter which is slightly greater than the diameter of the combination of the diseased area and the "grey zone". For example, if the protruding cone 26 and the "grey zone" 30 together comprise a diameter of four millimeters, the vaulting zone 12 of the lens 10 should be about five millimeters. The remainder of the posterior surface of the lens is then constructed as described above. Thereafter, a normal refracting can be conducted over the anterior surface 11 of the lens to determine the exact prescription required to correct any other vision deficiencies of the patient. The anterior surface 11 of the lens is then machined or otherwise fabricated to the prescription. The final lens has a back or posterior surface which specifically fits the cornea as described above and a front or anterior surface in accordance with the prescription to correct the visual dificiencies of the patient.

From the foregoing description it can be seen that the present invention comprises a contact lens for the eye of a patient with a keratoconus diseased cornea which provides more consistent visual acuity with less irritation to the patient. In addition, the lens helps to control the spread of the disease. It will be recognized by those skilled in the art that changes may be made to the above-described embodiment of the invention without departing from the broad inventive concept thereof. It is understood, therefore, that this invention is not limited to the particular embodiment disclosed, but it is intended to cover all modifications which are within the scope and spirit of the invention which are defined by the appended claims.

I claim:

1. A corneal contact lens for the eye of a patient with a keratoconus diseased cornea, the lens having a posterior surface comprised of:
   a first generally circular vaulting zone having a diameter slightly greater than the diameter of the diseased area of the cornea and having a radius of outward curvature generally corresponding to but slightly greater than the outward protrusion of the diseased area, the first zone being generally centered upon, generally parallel to and spaced from the diseased area of the cornea;
   a second generally annular transition zone extending radially beyond the first zone, the second zone having a radius of curvature flatter than that of the first zone; and
   a third generally annular bearing zone extending radially beyond the second zone, the third zone having a radius of curvature flatter than that of the second zone.

2. The lens as recited in claim 1 and further including a generally annular fourth, peripheral zone extending about 0.03 millimeters beyond the third zone to the periphery of the lens, the fourth zone comprising an outwardly extending edge of the lens to facilitate circulation of oxygen between the lens and the cornea.

3. The lens as recited in claim 1 wherein the second zone extends 0.05 to 0.07 millimeters radially beyond the first zone.

4. The lens as recited in claim 3 wherein the radius of curvature of the second zone is about 1.25 diopters flatter than the radius of curvature of the first zone.

5. The lens as recited in claim 4 wherein the radius of curvature of the third zone is about 2.0 diopters flatter than the radius of curvature of the second zone.

6. A method of making a corneal contact lens for the eye of a patient with keratoconus disease comprising the steps of:
   establishing the position, size and topography of the diseased area of the cornea;
   fabricating a contact lens having an anterior surface and a posterior surface, the posterior surface comprising a first generally circular vaulting zone having a diameter slightly greater than the diameter of the diseased area of the cornea and having a radius of outward curvature generally corresponding to but slightly greater than the outward protrusion of the diseased area so that when the lens is in place on the patient's eye the first zone is generally centered upon, generally parallel to and spaced from the diseased area of the cornea, a second generally annular transition zone extending radially beyond the first zone, the second zone having a radius of curvature flatter than that of the first zone, and a third generally annular bearing zone extending radially beyond the second zone, the third zone having a radius of curvature flatter than that of the second zone;
   refracting the patient to determine the prescription required; and
   fabricating the anterior surface of the lens in accordance with the prescription.

* * * * *